No. 610,287. Patented Sept. 6, 1898.
A. I. SIMMONS.
MOWING MACHINE.
(Application filed Feb. 3, 1897.)

(No Model.) 6 Sheets—Sheet 1.

WITNESSES.
Rich. A. George
E. W. Jones

INVENTOR.
ADOLPHUS I. SIMMONS.
By Risley, Robinson & Love
ATTORNEY's.

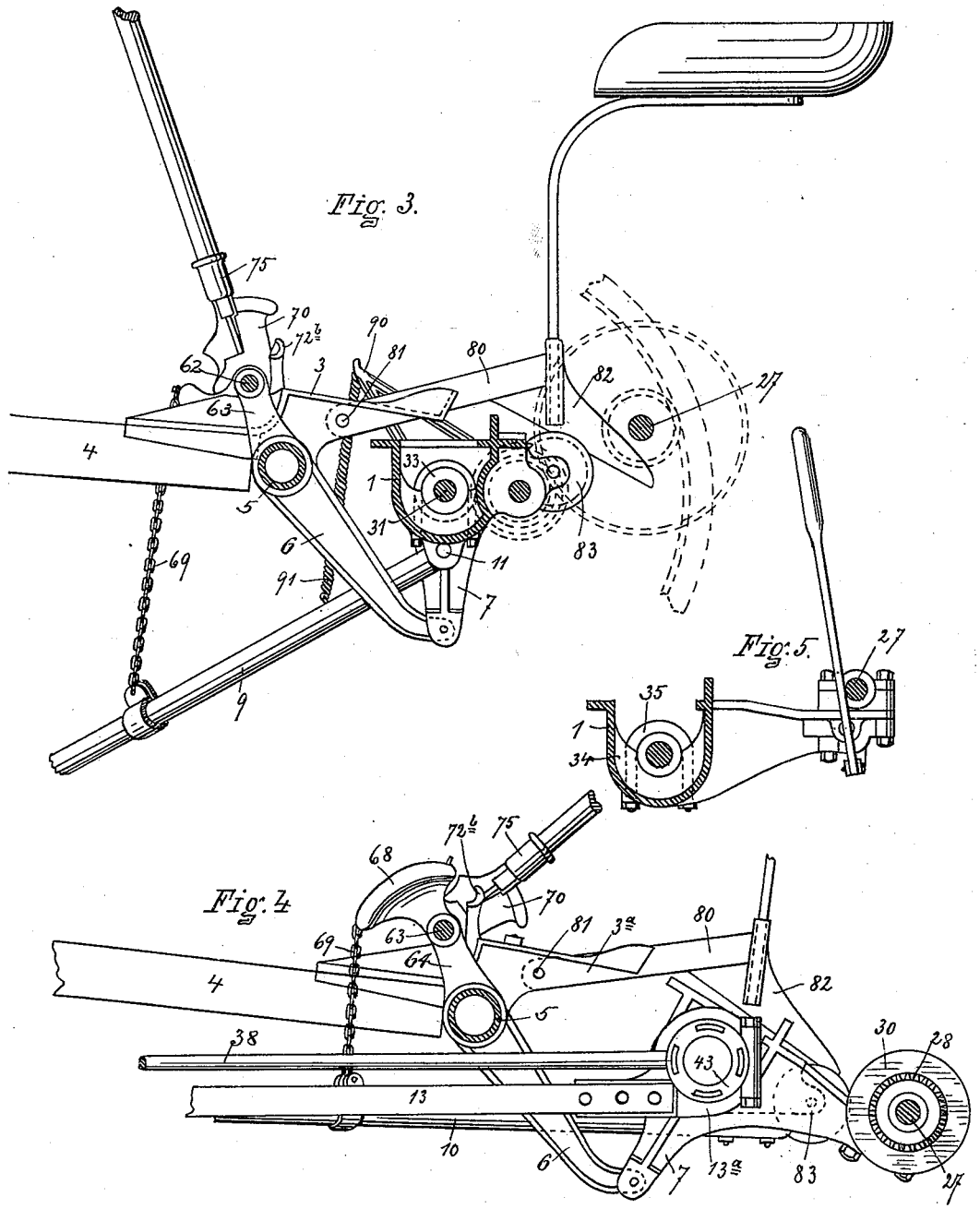

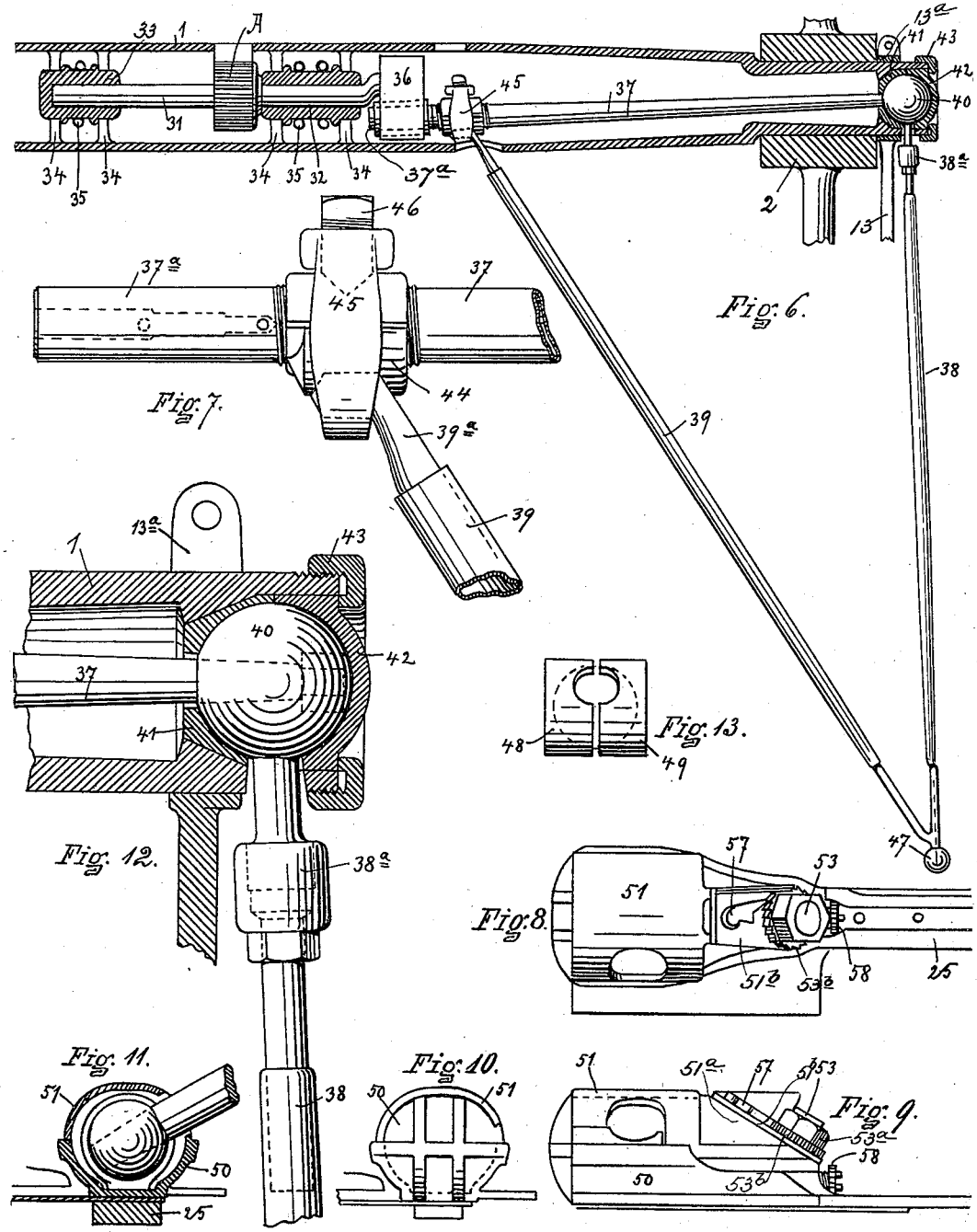

No. 610,287. Patented Sept. 6, 1898.
A. I. SIMMONS.
MOWING MACHINE.
(Application filed Feb. 8, 1897.)
(No Model.) 6 Sheets—Sheet 4.
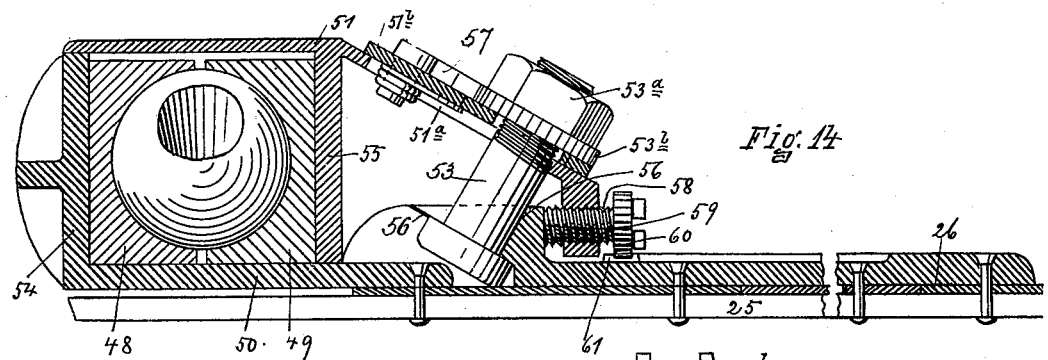
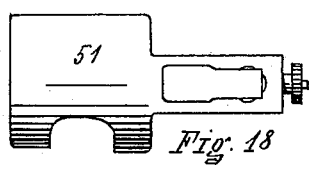
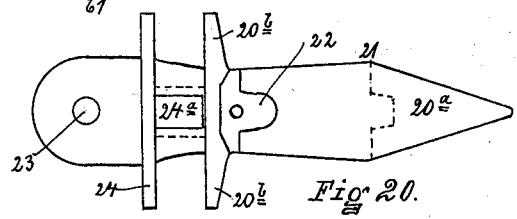
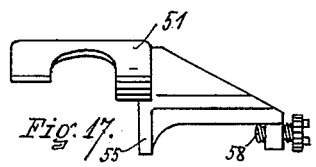
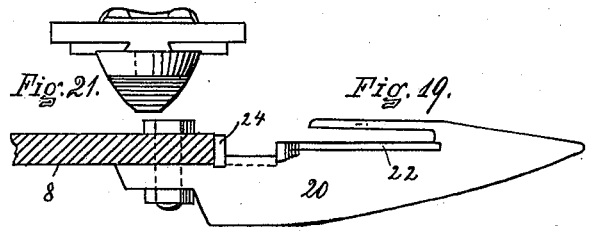
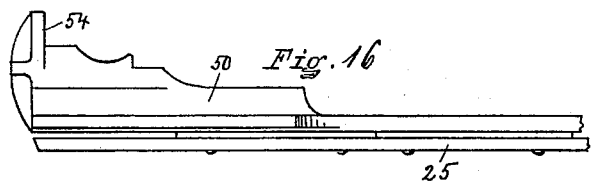
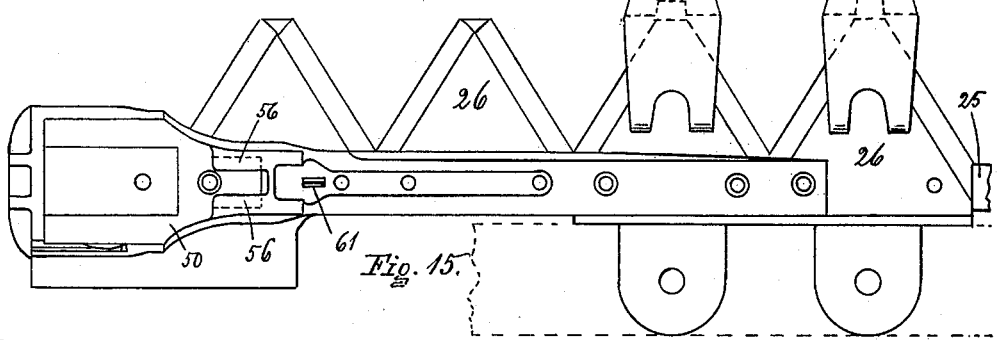
WITNESSES
Rich. A. George
E. W. Jones
INVENTOR
ADOLPHUS I. SIMMONS.
By Risley, Robinson & Love
ATTORNEY'S No. 610,287. Patented Sept. 6, 1898.
A. I. SIMMONS.
MOWING MACHINE.
(Application filed Feb. 3, 1897.)
(No Model.) 6 Sheets—Sheet 5.
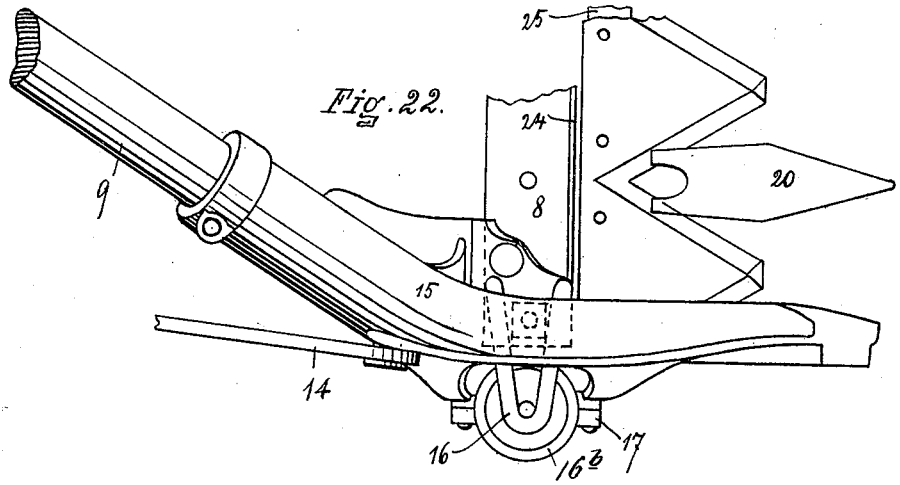
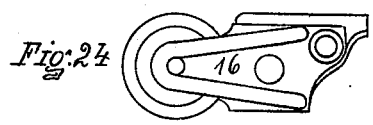
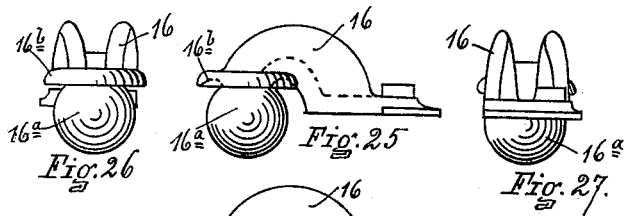
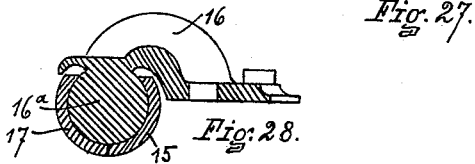
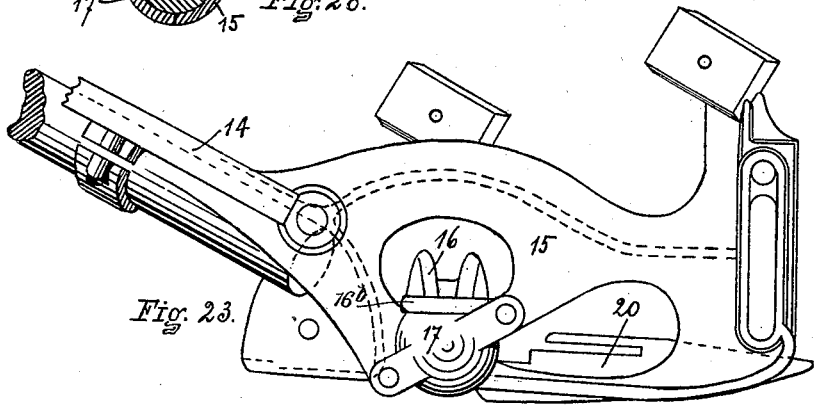
WITNESSES
Rich. A. George.
E. W. Jones
INVENTOR
ADOLPHUS I SIMMONS.
By Risley, Robinson & Love
ATTORNEYS

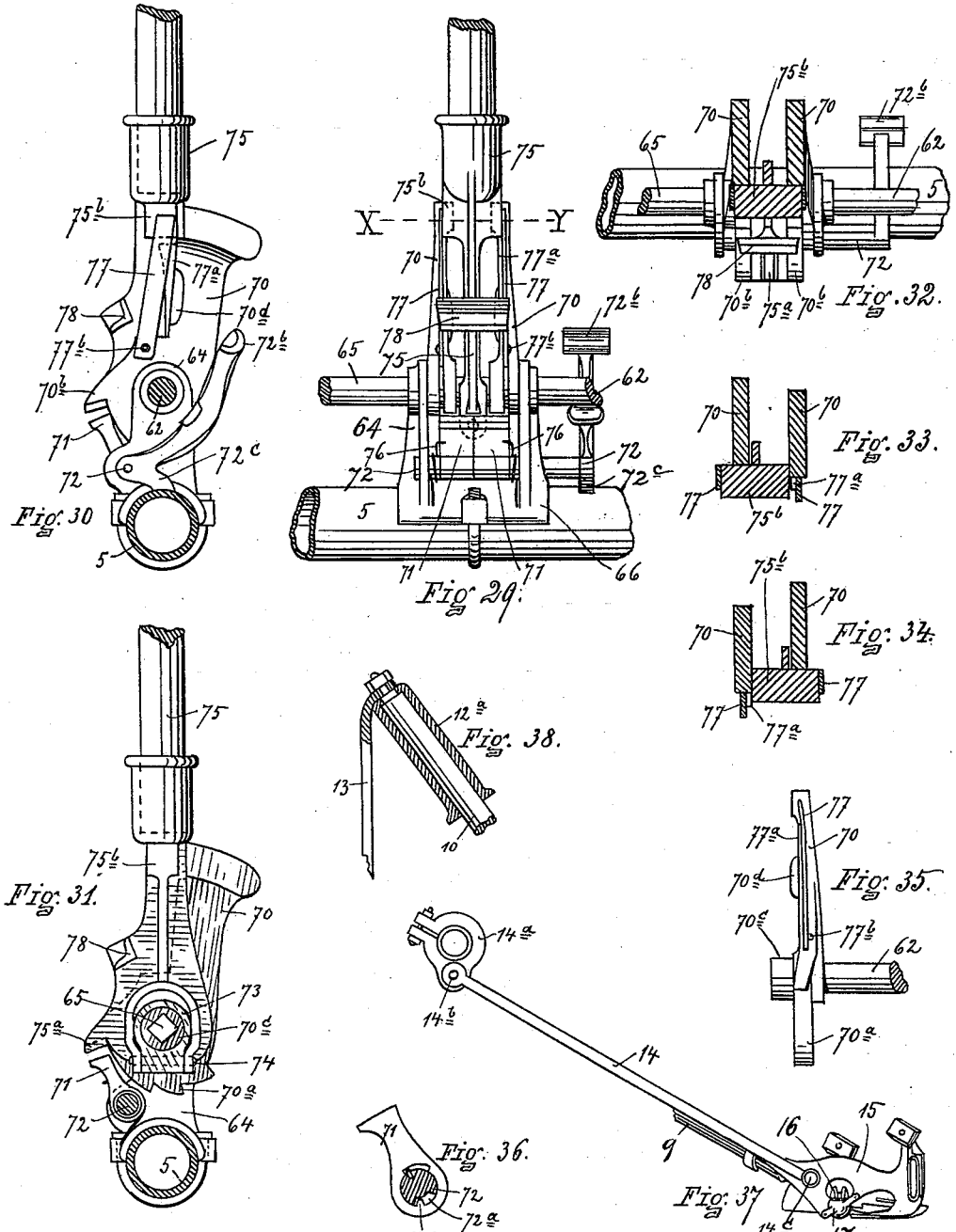

UNITED STATES PATENT OFFICE.

ADOLPHUS I. SIMMONS, OF UTICA, NEW YORK.

MOWING-MACHINE.

SPECIFICATION forming part of Letters Patent No. 610,287, dated September 6, 1898.

Application filed February 3, 1897. Serial No. 621,773. (No model.)

*To all whom it may concern:*

Be it known that I, ADOLPHUS I. SIMMONS, of Utica, in the county of Oneida and State of New York, have invented certain new and useful Improvements in Thrust-Cut Mowing-Machines; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

Figure 1:
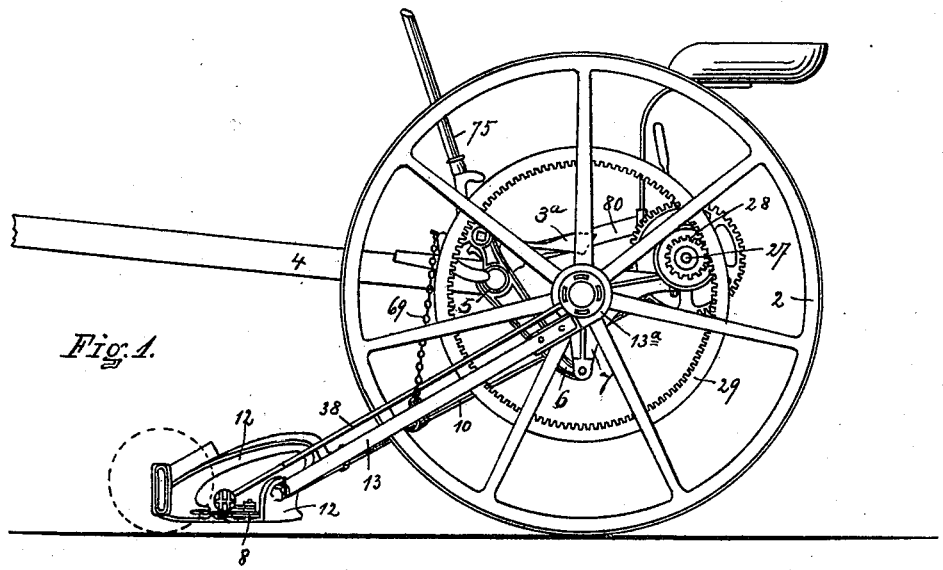
Figure 2:
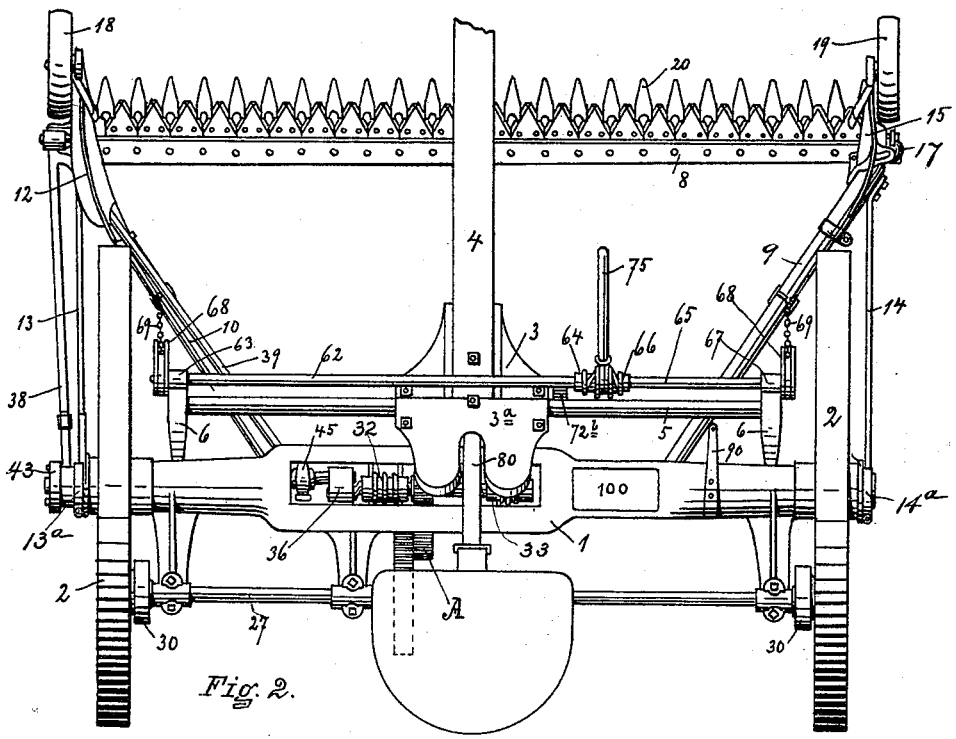

In the drawings, Figure 1 shows a side elevation of a mowing-machine embodying my improvements, except that the lead-wheel on the machine is shown only in dotted outlines. Fig. 2 shows a plan view of the machine. Fig. 3 shows a section of the machine, showing certain details in dotted outlines. In this figure the parts are shown in the position which they assume when the cutter-bar is down. Fig. 4 shows a side elevation of the working parts of the machine with the drive-wheel removed and the parts shown in the position which they assume when the cutter-bar is raised. Fig. 5 shows a cross-section of the frame of the machine, showing particularly the manner of securing a bearing-box and the supports for the back shaft with portions of the mechanism for putting the machine in and out of gear. Fig. 6 shows details of the knife-driving mechanism in connection with a partial longitudinal section of the frame of the machine. Fig. 7 shows details of construction of a triangular frame constituting a part of the knife-driving mechanism. Fig. 8 shows a plan view of the knife-head. Fig. 9 shows a side elevation of the same. Fig. 10 shows an end view. Fig. 11 shows details, partially in section, of the ball-and-socket joint between the triangular oscillating frame and the knife. Fig. 12 shows details of the ball-joint of the oscillating frame in the end of the axle or frame. Fig. 13 shows details of bearing-boxes employed in the joint between the knife and ball on the end of the triangular knife-operating frame. Fig. 14 shows a longitudinal sectional view of the knife-head. Fig. 15 shows a plan view of the knife and knife-head with the removable parts of the head removed and in connection with guards of the finger-bar. Fig. 16 shows an edge view from the lower side of the knife-head as shown in Fig. 15. Fig. 17 shows in side elevation a cap or top employed in connection with the knife-head removed from the other part of the head which is shown in Fig. 16. Fig. 18 shows a plan view of the parts shown in Fig. 17. Fig. 19 shows a side elevation of the guard in connection with a portion of the finger-bar in cross-section. Fig. 20 shows a plan view of the guard. Fig. 21 shows a rear end view of the guard. Fig. 22 shows a plan view of the right-hand or free end of the finger-bar, including the shoe and joint at this end of the cutter-bar with the lead-wheel omitted. Fig. 23 shows a side or end elevation of the parts shown in Fig. 22. Fig. 24 shows a plan view of parts of the joint between the shoe and finger-bar. Fig. 25 shows a side elevation of the parts shown in Fig. 24. Fig. 26 shows an end view from the left-hand end of the part shown in Fig. 25. Fig. 27 shows the opposite end view of the same part. Fig. 28 shows details of the joint, partially in section. Fig. 29 shows a front view of the finger-bar-hoisting lever with its mountings and attachments. Fig. 30 shows a side elevation of the parts shown in Fig. 29 as seen from the right of Fig. 29. Fig. 31 shows in part the same parts shown in Fig. 30, the parts in the front of the latter figure being removed. Fig. 32 shows a section on line X Y of Fig. 29, with a plan view of the parts below this line. Fig. 33 shows some of the parts shown in Fig. 32 in one of the positions which they assume in operation. Fig. 34 shows the same parts in another position which they may assume in operation. Fig. 35 shows a front end view of a ratchet-segment provided on the end of the hoisting-shaft which operates on the left-hand end of the cutter-bar. Fig. 36 shows details of a dog or pawl employed in the construction illustrated in Figs. 29 to 31, inclusive, in connection with a cross-section of the shaft on which it is mounted. Fig. 37 is a view of the right-hand end of the axle outside of the wheel, showing the bracket to which is pivoted one of the thrust-braces. Fig. 38 shows details, partially in section, of the joint between the left-side thrust-arm and the shoe mounted thereon and also the connection between the thrust-arm and its brace.

Referring to the reference letters and figures in a more particular description of the machine, 1 indicates the main frame, which is hollow and preferably of cast metal and provided at its ends with carrying and drive wheels 2 2. The machine is provided with a draft-frame 3, consisting of a small platform 3$^a$, a pole 4, and a bar 5, which carries at its outer ends downwardly-extending arms 6, which are pivoted at their lower ends to the downwardly-extending arms 7, formed on the frame 1, which constitute an underdraft. The finger-bar 8 is carried by thrust-bars 9 and 10. The upper end of the bar 10 is secured rigidly to the frame, as shown in Fig. 4, while the upper end of the arm 9 is pivoted at 11 to an ear on the under side of the frame. The left-hand thrust-bar 10 has attached at its lower end the shoe 12, to which it is jointed and to which the left-hand end of the finger-bar is rigidly attached. The joint between the thrust-bar 10 and shoe 12 is shown in detail in Fig. 38. The sleeve portion 12$^a$ of the shoe 12 is received on the end of the arm 10, which is round and permits a rocking movement of the sleeve and shoe as the right-hand or free end of finger-bar rises and falls. To provide against the lateral movement of the finger-bar and give stiffness to the construction, there is provided a brace 13, which is secured at its forward lower end to the front end of thrust-arm 10, as shown in Fig. 38, and at its upper end is secured on the end of the axle-frame by the clamping-head 13$^a$, which also serves to hold the wheel in position on the bearing on the end of the axle-frame. A similar bracing-bar 14 is provided on the right-hand end of the machine, secured to the axle by a clamp 14$^a$, to which it is pivoted at 14$^b$ and pivoted at its lower forward end to the right-hand shoe 15 at 14$^c$. The right-hand end of the finger-bar is provided with a curved arm 16, (see Figs. 22 to 28, inclusive,) which carries on its end a ball 16$^a$, which is when in position on the bar substantially in line with the bar and is received by a socket formed in part in the shoe 15 and in part by a cap 17, as more clearly shown in Fig. 28. This joint is provided with an overhanging edge or rim 16$^b$, adapted to exclude dirt and foreign matter. This joint affords a flexible connection between the right-hand end of the finger-bar and the right-hand shoe 15 in the line of the finger-bar. The shoes 12 and 15 carry the lead-wheels 18 and 19, respectively, as well as mountings for grass-rods (not shown) and track-clearer (not shown) and providing means for adjusting the lead-wheels, all of which are details to which no special attention need be given. The finger-bar is provided with guards 20 20. The guards 20 are made widest transversely at the point marked 21 in Fig. 20, immediately back of the point 20$^a$, and from the point 21 back toward the finger-bar the guard, with its ledger-plate 22, becomes narrower. By making the guard wide at the point designated the distance between the guards is less at this point, which protects the points of the knife-sections better, particularly against loose or rolling stones, as well as affording advantages in cutting, as hereinafter pointed out. The guard is secured to the finger-bar by a bolt or rivet passing through the opening 23 in the shank of the guard, with the front edge of the finger-bar abutting against the strip or block 24. The strip or block 24 is secured in the guard by a dovetailed projection 24$^a$ engaging in a dovetailed recess in the guard, as shown, and this block or strip furnishes a backing for the knife-bar 25, as the knife-bar takes a position in the guard between the block 24 and the wings 20$^b$ 20$^b$, with the sections 26 occupying a position over the ledger-plate 22. The block-piece 24 is held against displacement toward the front by the front end of the dovetailed piece abutting against a shoulder on the guard, as shown. The relative angle of the cutting edge of the knife-section being reduced by making the sides and cutting edges of the guards converging from a point ahead of the point of the section toward the rear, the tendency to force the grass forward out of the guard when the machine is in operation is reduced, resulting in a material saving of power, as well as more effectively performing the cut.

In providing the removable blocks or strips 24 immediately back of the knife-bar and between it and the front side of the finger-bar provision is made for taking up the wear. The tendency of the knife-bar is to wear backwardly against the front edge of the finger-bar, and by removing the guards the blocks or pieces 24 can be removed and new ones substituted, when the guards are replaced on the finger-bar and the knife-bar is thereby held in its forward position with the sections well front in the guards.

The mechanism for driving the knife consists of a back shaft 27, carried in bearings supported by rearwardly-projecting arms on the axle-frame and provided at each end with gear-pinions 28, which mesh with the large internal gear 29 of the driving-wheels 2. Between the pinions 28 and the shaft 27 may be provided an ordinary ratchet 30, such as is ordinarily provided in this class of mowing-machines. The back shaft 27 is geared to the crank-shaft 31 by a suitable system of gears A, which will not require particular description. The crank-shaft 31 is located within the hollow axle-frame 1 and is supported in bearings 32 33. The bearings 32 and 33 are supported by transverse internal ribs 34 in the frame and are secured in position by U-bolts 35. On the crank-shaft 31 is rigidly secured a head 36. A triangular oscillating frame, consisting of bars 37, 38, and 39, is provided at its outer corner with a ball-bearing 40, which is supported in a box in the outer end of the axle or frame outside of the wheel 2. The box consists of the two pieces 41 and 42, secured in position within the hollow end of the axle or frame by a screw-cap 43. The bar 37 is secured at its outer end in the ball 40 and extends to the crank head or wheel 36, which it engages with by being passed into the hole in the wheel, the wrist-pin portion $37^a$ being formed on or with the bar 37 instead of being secured in the crank-wheel, as is usual with wrist-pins. The opening in the wheel 36 which receives the wrist-pin $37^a$ is at such an angle with the shaft 31 that the axis of the opening when projected will strike the center of the ball 40. The bar 38 is provided with a coupling or joint $38^a$, whereby it can be disconnected or slightly adjusted in length. To the bar 39 is coupled the bar 37, adjacent to the wrist-pin, as follows: There is provided on the bar 37 a split collar 44, which is screw-threaded onto the bar, as shown, so that it may be adjusted a limited distance lengthwise of the bar 37. The collar 44 has a recess in one side adapted to receive the hooked end $39^a$ of the bar 39, and the bar is secured and the split collar clamped by a yoke 45, which surrounds the collar 44 with the hooked end of the bar 39 and is held by a set-screw 46. By disconnecting the joint last described, as well as the joint $38^a$, the bar 37 is left free to be inserted through the outer end of the axle, when the cap 43 is removed or replaced at pleasure. At the finger-bar end of the oscillating frame the bars 38 and 39 of the frame are united and carry a bearing-ball 47, which is located exactly in the axial line of the bars 38 and 39. This construction reduces the strain on the bars to the minimum, and they are preferably made tubular to have them light and stiff.

In coupling the oscillating frame to the knife-bar 25 the ball 47 is received between the bearing-pieces 48 49, which are hollowed out on their inner faces to adapt them to receive the ball. These bearing-pieces 48 and 49 are loosely received within the knife-head, which consists of a stationary piece 50, rigidly secured on the end of the knife-bar, and the cap-piece 51, secured thereto by a bolt and nut 53. The pieces 48 and 49 are held from movement longitudinally of the knife by the end wall 54 on the knife-head and the wall 55 on the cap-piece; but the pieces are permitted a transverse or lateral movement with reference to the knife-bar, as will be seen by the surrounding space shown particularly in Fig. 11. The bolt 53, which secures the cap or cover of the knife-head, is located at an angle, as shown, and is removably held to the fixed portion of the knife-head by having the head of the bolt engaged under the inclined shoulders 56 on the fixed portion of the head. The bolt passes through an opening in the removable plate $51^b$, which when in position rests upon the incline $51^a$ of the cap-piece. The nut $53^a$ acts on the removable piece $51^b$ and is provided with a ratchet $53^b$, which is engaged by the spring-pawl 57 to prevent the nut getting loose. The pawl 57 is pivoted on the plate $51^b$. By the arrangement of bolt 53 at an inclination, as shown, acting on the inclined end of the cap 51, I am enabled to take up the wear as between the ball-joint 47 and its socket-pieces and as between the socket-pieces and the knife-head. However, in order to prevent too much binding on the bearing-ball 47, I provide a stop-screw 58, threaded into the end of the cap 51 and adapted to engage against the shoulder 59 on the fixed portion of the head. By adjusting this screw the tendency of the bolt 53 to bind the parts on the bearing-ball can be limited. To secure the set-screw 59 against accidental movement or working out of place when the machine is in motion, I provide on the head of the stop-screw ratchet-teeth 60 and on the fixed portion of the knife-head a fixed tooth 61, adapted when the cap is in position to engage in the ratchet-teeth of the head of the screw 58 and prevent its rotation while the cap is in position on the knife-head.

For hoisting the finger-bar, both ends simultaneously or either at pleasure, the following mechanism is provided: a section of shaft 62, mounted in bearings 63 64 on the draft-frame, and also another section of shaft 65, mounted in bearings 66 67 on the draft-frame. At their outer ends the shafts 62 and 65 carry grooved sectors 68 68, from which chains or other connections 69 extend down to the thrust-bars and are secured thereto, respectively. The adjacent ends of the shafts 62 and 65 have secured thereon ratchet segments or heads 70 70, which are provided on the portion below the shaft with ratchet-teeth $70^a$, adapted to engage upon pawls 71, mounted on a short rock-shaft 72, supported in the bearing-pieces 64 and 66. The ratchet-segments 70 are also provided with a stop-tooth $70^b$, adapted to strike on the pawl 71 and limit the forward-swinging movement thereof. The ends of the shafts 62 and 65 are squared to receive the ratchet-segments 70, as appears more particularly in Fig. 31, and they are also provided on their adjacent or meeting faces with hubs $70^c$. On the hubs $70^c$ of the two ratchet-heads is mounted a collar 73, which is free to rotate on the hubs and has a downwardly-extending portion to which is pivoted at 74 the lower end of the lever 75. The lever 75 is provided with a tooth-like shoulder $75^a$, also adapted to strike on the top of the pawls 71 and limit the forward-swinging movement of the lever. It will be understood that the foot of the lever 75 is located between the two ratchet-segments 70, and by reason of the pivot 74 is allowed a sidewise-swinging movement with reference to the ratchet-heads. It will be understood that there are two pawls 71 employed, one for each ratchet, mounted side by side on the same shaft 72, as more clearly shown in Fig. 29, and these pawls are held in engagement with the ratchet-teeth 70ª by springs 76 76. In order to allow a certain amount of independent movement of the two pawls, the shaft 72 is provided with a groove 72ª, Fig. 36, which is of a length to receive both pawls, and the pawls are each provided with a spline 71ª, engaging in the groove 72ª, the spline being made narrower than the width of the groove to permit the desired movement. The pawls are operated to disengage them from the ratchet-teeth 70ª by the treadle-lever 72ᵇ, secured on one end of the shaft 72. The movement of the lever 72ᵇ is limited in one direction by the stop 72ᶜ thereon coming in contact with the tubular frame-bar 5 and in the other by the shaft 62. The lever 75 has a block-like portion 75ᵇ, which in its middle or central position, as shown in Figs. 29 and 32, is adapted to engage the outer or swinging ends of both of the ratchet-heads 70 70. The handle is maintained in this position, when not forcibly displaced, by the action of the springs 77 77 acting upon either side of the block 75ᵇ. These springs are secured to the ratchet-segments 70 at 77ᵇ and are limited in their inward movement by stops 77ª. The lever 75 is also provided on its front side with a cross-bar 78, which stands somewhat in front of the shoulder on the back of the block-piece 75ᵇ. When it is desired to elevate both ends of the finger-bar at the same time, the operator allows the lever 75 to keep its middle or central position between the ratchet-heads 70 70, as shown in Figs. 29 and 32, in which position, as the lever is drawn back, the rear side or shoulder of the block portion 75ᵇ of the lever engages the upper ends of both of the ratchet-heads 70 and causes shafts 62 and 65 to rock and by means of the sectors at their ends take up the chain attached thereto and elevate the finger-bar. In case the operator desires to raise only one end of the finger-bar at a time he swings the upper end of the lever toward the end of the finger-bar which he desires to raise. This moves the block 75ᵇ over in front of the upper end of the ratchet-head 70, which is on that side of the machine and away from in front of the upper end of the other. Then as the lever is drawn back only one of the rock-shafts 62 or 65, as the case may be, is operated. In order to prevent one end of the finger-bar being elevated unnecessarily higher than the other, the cross-piece 78 on the front of the lever is provided, and after the lever has moved back a sufficient distance to give one end of the finger-bar the desired elevation over the other the cross-piece 78 strikes against the front side of the ratchet-head 70 or on the lug 70ᵈ thereof, when if the lever is moved farther the other ratchet-head will then be moved also, and with it the other end of the finger-bar will be raised. The arrangement of the ratchet-teeth 70ª is such that a tooth will be caught by the pawl 71 operating on the ratchet-head being moved before the cross-bar 78 has come in contact with the other ratchet-head to cause it to move. The operator may, after having raised one end of the finger-bar to a point where it is caught in the first notch of the ratchet, then move his lever forward and swing it to the other side to catch the other ratchet-head 70 and then raise the other end of the finger-bar. When the finger-bar is to be lowered, the operator may hold down the handle 75 and release the pawls 71 by pressing on the treadle 72ᵇ, and when the pawls are disengaged from the ratchet-teeth 70ª he may then let the finger-bar gently down by the lever, or after the finger-bar has been elevated the lever 75 may be thrown forward into the position in which it is shown in Figs. 1 and 2, where it will stand by reason of the tooth-like shoulders 75ª thereof engaging on the end of the pawl. Then when the finger-bar is to be lowered the operator strikes the treadle-lever 72ᵇ with his foot, throwing out the pawls 71, which allows the finger-bar to drop to the ground. The several positions which the block 75ᵇ of the lever-handle may take with reference to the ratchet-heads 70 70 are shown in Figs. 32, 33, and 34. To assist the finger-bar, and particularly the right-hand end thereof, in floating easily and freely in operation, I provide a spring 91, attached at the lower end to the thrust-bar 9 and at the upper end to the spring-bracket 90 on the frame. The underdraft on the frame does not operate on the right-hand end of the finger-bar except through the medium of this spring.

The seat-support 80 is pivoted to the draft-frame at 81 and is provided with a rearwardly-extending inclined arm 82, which runs on the groove-pulley 83, pivoted on the rear side of the axle-frame. When the frame is rocked from the position shown in Fig. 3 to that shown in Fig. 4, in raising the finger-bar the arm 82 of the seat-support runs along on the wheel 83, maintaining the seat in its normal position, while the parts of the frame change their relative positions. By this arrangement also the weight of the driver is thrown mostly on the pulley 83, back of the axial line of the frame, acting to some extent as a counterweight to the finger-bar. The hollow frame at one end of the crank-shaft is used for a tool-box 100.

The operation of this class of thrust-cut mowing-machines being well understood, particular description of its operation may be omitted. It may, however, be noted that in this class of machines successful operation depends on getting the drive-wheels of the machine close enough together so that they will not track outside of the cut made by the finger-bar. This fact necessarily puts the end of the knife-bar at the point to which the mechanism for driving it should attach outside of the plane of the adjacent drive-wheel, and to successfully connect the knife-driving mechanism at this point without an unnecessary number of parts which are simple and durable is a point which has heretofore been very difficult to attain and which I believe is satisfactorily accomplished in my construction of machine. It is obvious that by making the parts 37 and 38 of the triangular rocking frame strong enough and strongly united the bar 39 could be omitted. Also the bar 37 might be omitted by suitably strengthening and modifying other parts, and when the term "oscillating frame" or other reference to this part is herein employed it is not to be understood as necessarily including a triangular frame having present all three sides, and it is evident that numerous other changes and variations in the details of the construction from those herein shown and described may be made without departing from the spirit of my invention.

What I claim as new, and desire to secure by Letters Patent, is—

1. The combination in a mowing-machine of a hollow axle-frame, wheels, finger-bar, reciprocating knife, a knife-operating mechanism consisting in part of a triangular oscillating frame pivoted at one corner outside of the wheel, one side of the frame extending through the hollow axle-frame, substantially as set forth.

2. The combination in a mowing-machine of a hollow frame, driving-wheel, finger-bar, reciprocating knife, knife-driving mechanism consisting in part of an oscillating frame pivoted on one side of the driving-wheel and a driving-crank located on the other side of the driving-wheel, substantially as set forth.

3. The combination in a mowing-machine of a frame, driving-wheels, a finger-bar located in front of the frame, a reciprocating knife in the finger-bar, a bar connecting the knife-bar and the outer end of the frame and pivoted to each, a knife-driving mechanism and a connection 39 between the knife-driving mechanism and the said connecting-bar adjacent to the knife, substantially as set forth.

4. The combination in a thrust-cut mowing-machine of a frame, driving-wheels, a finger-bar located in front of the frame, a reciprocating knife and a knife-driving mechanism consisting in part of an angular frame, one side of which passes through the drive-wheel, substantially as set forth.

5. The combination in a thrust-cut mowing-machine of a frame, drive-wheels, a finger-bar located in front of the frame and connected therewith by thrust-arms at either end, one of the thrust-arms being pivoted to the main frame and connected to the end of the finger-bar by a ball-joint in line with the finger-bar, substantially as set forth.

6. The combination in a mowing-machine of a frame, driving-wheels, a finger-bar located in front of the frame, and having shoes at each end, thrust-bars between the frame and shoes, one of which thrust-bars is rigidly attached to the frame and jointed to the shoe, and the other of which thrust-bars is pivoted to the frame and rigidly attached to the other shoe and a joint between the latter shoe and the finger-bar in the line of the finger-bar, substantially as set forth.

7. The combination in a mowing-machine of a frame, driving-wheels, a finger-bar located in front of the frame, thrust-bars connecting the frame with the finger-bar, a draft-frame and a seat-support pivoted to the draft-frame and having an arm running on a wheel pivoted on the rear of the main frame, substantially as set forth.

8. A joint between the finger-bar and shoe, consisting of a curved arm 16, a ball 16$^a$ in line with the finger-bar and a socket for receiving the same in the shoe, substantially as set forth.

9. In a mowing-machine finger-bar-hoisting device, two shafts, heads secured on the adjacent ends of the shafts, an intermediate laterally-swinging lever adapted to engage either or both of the heads, combined, substantially as set forth.

10. In a mowing-machine finger-bar-hoisting device, the two hoisting-shafts each provided with ratchet-heads including ratchet-teeth, an intermediate laterally-swinging lever adapted to act on both or either ratchet-head, and securing-pawls for engaging with the ratchet-teeth combined, substantially as set forth.

11. In a mowing-machine hoisting device the combination with the two hoisting-shafts 62 and 65 extending to opposite ends of the machine, of ratchet-heads 70 including ratchet-teeth secured upon the adjacent ends of the two shafts, an intermediate lever located between the parts 70 and adapted to engage simultaneously with both or to swing laterally so as to engage one only of the ratchet-heads and pawls combined, substantially as set forth.

12. The combination in a mowing-machine of a hollow axle-frame, driving-wheels, a knife, knife-driving mechanism consisting in part of an oscillating frame pivoted at one corner of the frame having a removable side and having one side extending through the drive-wheel, substantially as set forth.

13. In a mowing-machine driving mechanism a triangular frame having one corner secured by the split threaded sleeve 44, and yoke 45 engaging on the hooked end of one of the sides, substantially as set forth.

14. The combination in a mowing-machine of an axle, driving-wheels, a finger-bar and knife, a crank-shaft in the axial line of the driving-wheels, a bearing-ball at the end of the axle outside of driving-wheel, a connection between the crank-shaft and bearing-ball, and a connection between the bearing-ball and knife, substantially as set forth.

15. The combination in a mowing-machine of a hollow axle-frame, a driving-wheel, a knife, a knife-driving crank-shaft with crank located within the hollow frame, and a connection extending from the driving-crank through the axle to the knife, substantially as set forth.

16. In a mowing-machine a hollow axle-frame, a driving-wheel, a driving-crank and crank-shaft located within the frame in the axial line of the wheel and a connection from the crank to the knife, substantially as set forth.

17. The knife-bar of a mowing-machine having a hollow head adapted to receive and adjust the driving-bearing, consisting of a hollow fixed portion on the knife-bar open at top and one end, a hollow cap portion open at the bottom and one end and having an opposite inclined end, a securing-bolt acting on the inclined end, in combination with bearing-pieces received in the hollow of the head having a transverse movement within the head, substantially as set forth.

In witness whereof I have affixed my signature in presence of two witnesses.

ADOLPHUS I. SIMMONS.

Witnesses:
EDWARD L. WELLS,
E. WILLARD JONES.